United States Patent [19]

Lenaerts et al.

[11] 4,163,874
[45] Aug. 7, 1979

[54] MOLDED PLASTIC BASE PLATE FOR A TELEPHONE SET

[75] Inventors: George V. Lenaerts; Algirdas J. Dragunevicius, both of London, Canada

[73] Assignee: Northern Telecom Limited, Montreal, Canada

[21] Appl. No.: 904,739

[22] Filed: May 11, 1978

[51] Int. Cl.² ............................................. H04M 1/02
[52] U.S. Cl. ................................ 179/100 R; 179/179
[58] Field of Search ............... 179/100 R, 100 D, 178, 179/179, 146 R, 147, 100 L

[56] References Cited

U.S. PATENT DOCUMENTS

| | | | |
|---|---|---|---|
| 2,544,325 | 3/1951 | Johnson, Jr. et al. | 179/100 D |
| 3,126,454 | 3/1964 | Fresk et al. | 179/178 |
| 3,176,062 | 3/1965 | Nordstrom et al. | 179/146 R |
| 3,657,487 | 4/1972 | Schwanck et al. | 179/179 |

FOREIGN PATENT DOCUMENTS 2438026  2/1975  Fed. Rep. of Germany ........... 179/178

Primary Examiner—Kathleen H. Claffy
Assistant Examiner—Randall P. Myers
Attorney, Agent, or Firm—Sidney T. Jelly

[57] ABSTRACT

A base plate for a telephone set is molded of plastic instead of being a metal stamping and can be made of recycled scrap plastic material. The base plate is provided with a plurality of positions for mounting telephone set parts with each position having an arrangement of projections and one or more deflectable members whereby the telephone items can be mounted by sliding and downward movement to clip in, and with one or more of the positions also having alternative means for mounting items whereby alternate forms of an item can be interchangeably mounted.

9 Claims, 14 Drawing Figures

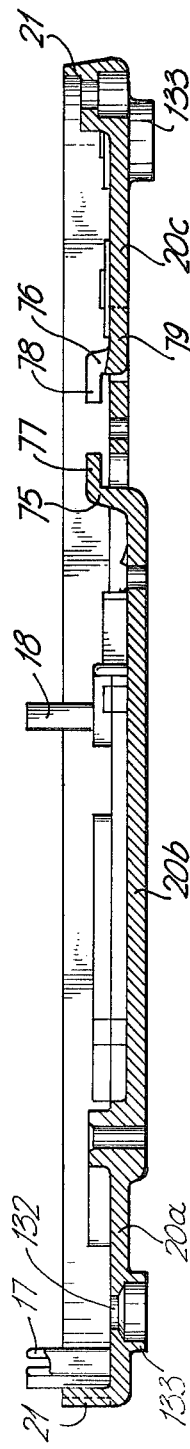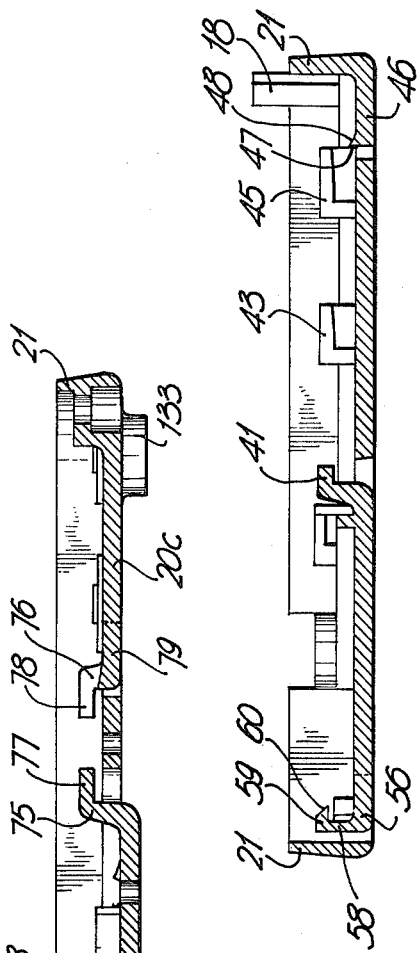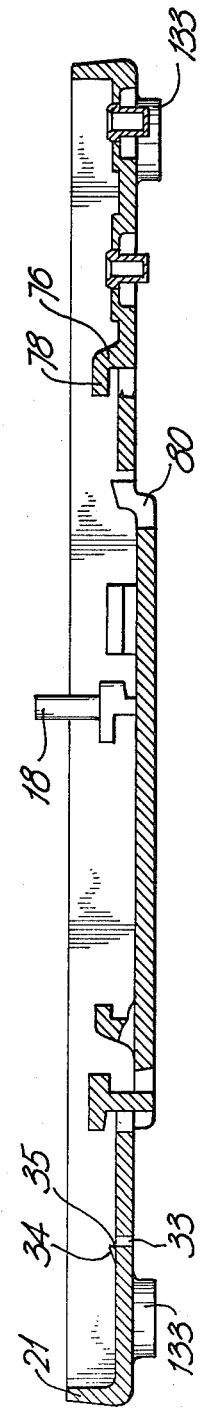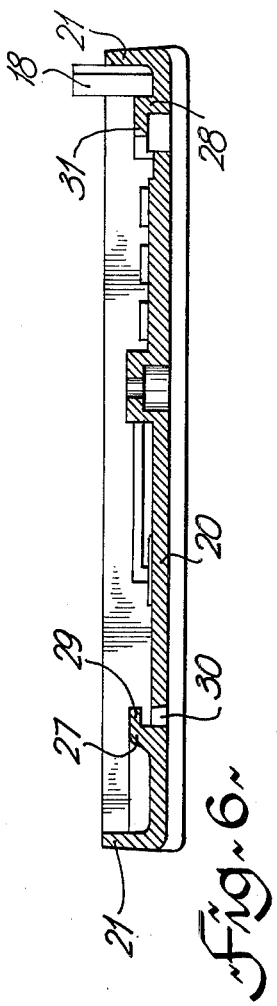

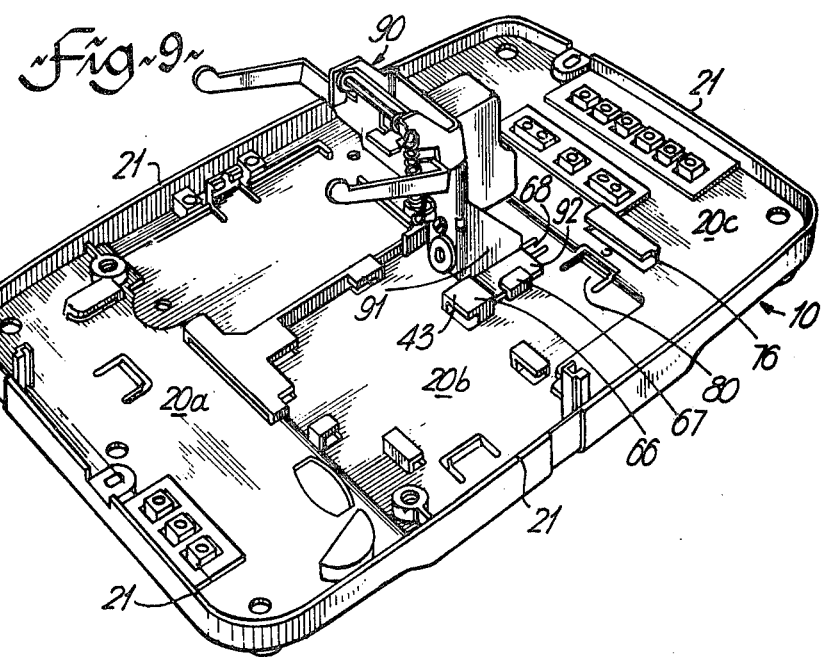
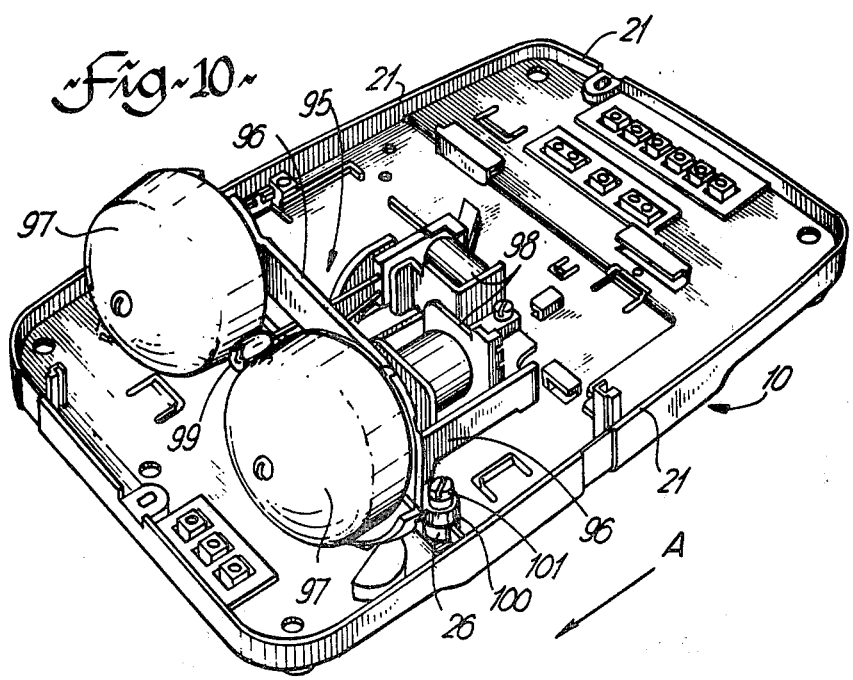

MOLDED PLASTIC BASE PLATE FOR A TELEPHONE SET

This invention relates to a molded plastic base plate for a telephone set and in particular to such a base plate which can accept, without alteration or the use of additional parts, various telephone circuit parts, which parts can be of differing forms. Thus, as an example, each telephone circuit part may be of two forms, one which is of a form which is attached to a conventional pressed metal base plate as by screws or rivets, and another form which can be attached by clipping into formations on the plastic base plate.

Conventionally, telephone set base plates are metal pressings or stampings with the various circuit parts of items attached thereto by screws, nuts and bolts, or rivets. In the manufacture of telephones, many parts are made of molded plastic and there is considerable production of scrap. This scrap has an extremely low resale value, although the original material is relatively expensive. The base plate of the present invention can be molded from scrap or reclaimed material, as well as new material although, economically, scrap material is preferable. As a base plate is hidden, lack of a good surface finish, and odd streaks and the like are not important. Also a fairly thick section can be used and therefore this offsets any strength deterioration in the plastic material.

The invention provides an economical way of using scrap plastic material, if desired, and also enables redesigned items having quick assembly characteristics to be used, while at the same time permitting original items to be used with the normal assembly or attachment arrangements.

The invention will be readily understood by the following description of a certain embodiment, by way of example, in conjunction with the accompanying drawings, in which:

FIGS. 3, 4, 5 and 6 are cross-sections on the lines III—III, IV—IV, V—V, and VI—VI respectively of FIG. 1;

FIG. 9 is a perspective view of the base plate with a hook-switch structure assembled to the base plate;

FIG. 10 is a perspective view of the base plate with one form of gong and armature assembly on the base plate;

Figure 2:
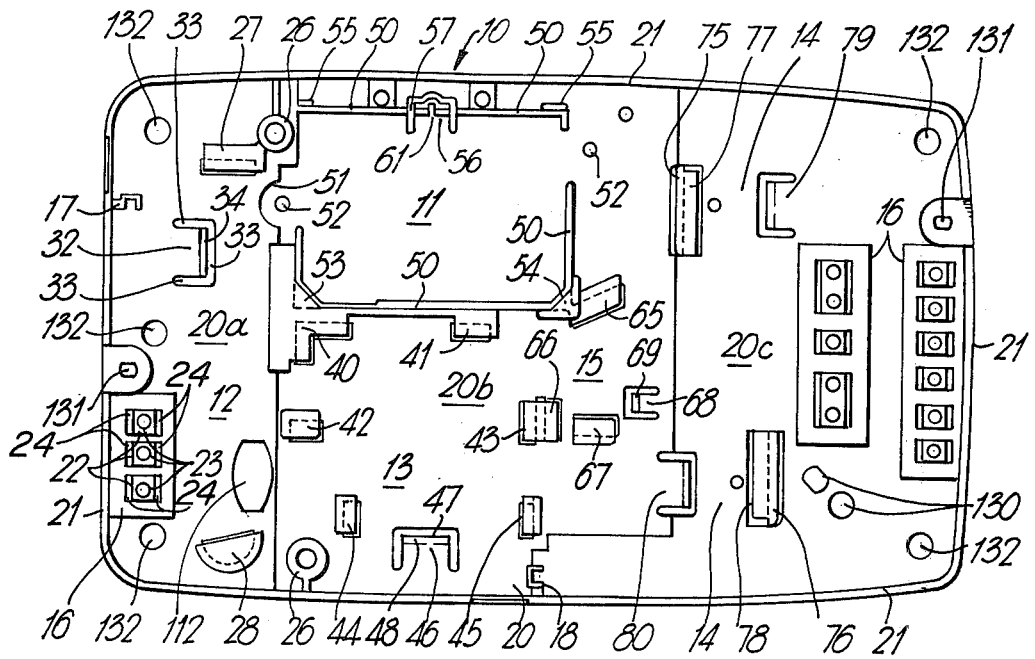
FIG. 2 is a plan view of the base plate of FIG. 1.
Figure 1:
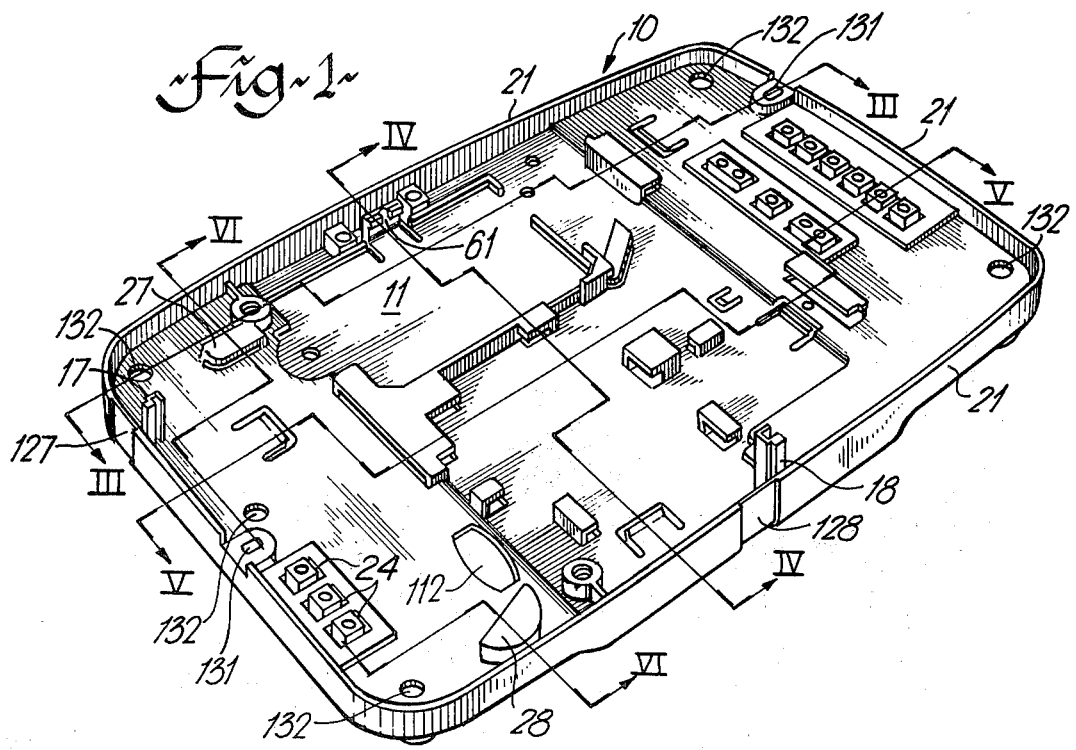
FIG. 1 is a perspective view of a base plate in accordance with the present invention.
Figure 8:
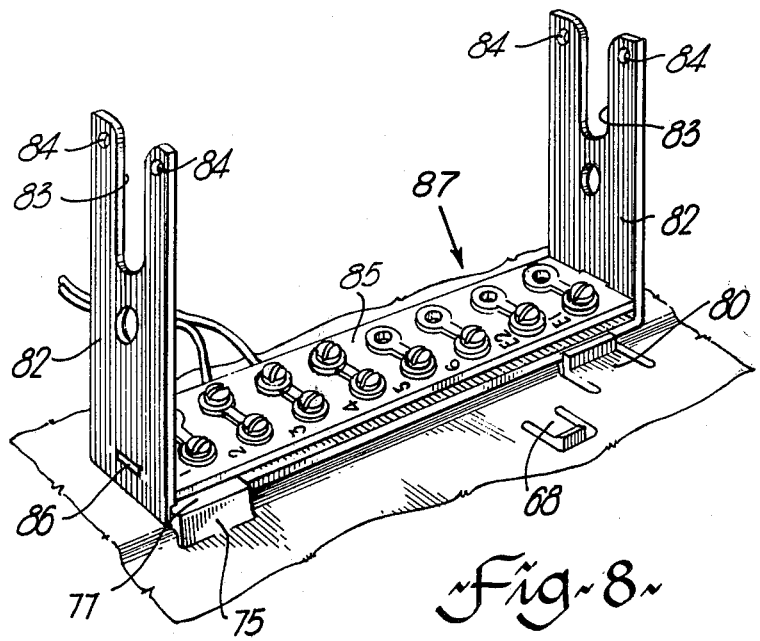
FIG. 8 is a similar view to that of FIG. 7, illustrating the addition of a terminal strip to the bracket.

As illustrated in FIGS. 1 and 2, a telephone base plate, indicated generally at 10 has, in the particular example, positions, or sites for various circuit members or assemblies as follows: network at 11, gong or bells and ringer armature assembly at 12 and 13, dial support brackets at 14, line switch at 15, terminals as required at 16, and line and handset cord restraints at 17 and 18.

In general a base plate comprises a base web 20 with an upwardly extending peripheral rim 21. In the example illustrated the base web 20 is in three sections 20a, 20b and 20c, the end section 20a and 20c being raised slightly relative to the centre section 20b, as can be seen in the longitudinal cross-sections of FIGS. 3 and 5. This is to match mounting levels with existing metal base plates.

Starting at the left hand end of the base plate 10, in FIGS. 1 and 2, there is molded integrally with the web 21 and the section 20a of the web 20, the line cord restraint 17. This is of channel cross-section to receive a hooked-shaped restraint member crimped on to the line cord in a conventional manner. Molded integrally with the section 20 is a small group of bosses 22 having central holes 23. Terminals can be positioned on the bosses 22, the terminals having tangs which pierce through thinned portions formed by recesses 24, the tangs being bent over under the base plate. The holes 23 serve as clearance holes for the screws of the terminals. Other terminals can be similarly attached at the other end of the base plate at 16.

Extending across the base plate is next the area 12 for the gong assembly and then adjacent to this position the gong armature assembly position 13. The armature and gong assemblies can be of two forms. A conventional form comprises a casting—usually a zinc casting—which has an upright web which carries the two gongs or bells, and a base web which carries the coil, armature and striking arm etc. Such an assembly can be mounted on the new base plate by positioning the base web within the area 13, the bottom edge of the upright web resting across the base plate in area 12. The assembly is then attached by self-tapping screws entering bosses 26.

An alternative arrangement has been proposed in which the gong assembly is separate from the armature assembly. This avoids using a fairly complex metal casting which is replaced by simple and cheap metal stampings, one for the gong assembly and one for the armature assembly. The gong assembly is held in place by the ends of the metal bracket being inserted under projections, sliding over a snap member. Thus, in FIGS. 1 and 2 there are two upwardly extending projections 27 and 28. Projection 27 extends parallel to the longitudinal axis of the base plate, near one edge, having a flange extending toward the centre of the base plate. This can be seen in FIG. 6, the flange indicated at 29. To permit entry of the core in molding, a hole 30 extends through the base plate. Projection 28 is inclined slightly to the longitudinal axis, as illustrated. The projection has a top flange 31 extending towards the longitudinal axis and is positioned near the opposite edge relative to the projection 27. At a position intermediate the projections 27 and 28, and nearer to projection 27 than projection 28, is a snap member 32. Snap member 32 is defined by a U shaped slot or hole 33 through the base plate, and an inclined rib 34 is formed on the upper surface at the free edge 35. This can be seen in FIG. 5. The snap member is positioned to one side of the space or area between the two projections and the free edge 35 of the snap extends towards this space—area 12. To assemble the gong support bracket to the base plate, a small projection at one end is inserted under top flange 31 of projection 28, with the bracket inclined and resting on top of the snap member 32. The bracket is then pressed down and rotated to slide a small projection at the other end under the flange 29 of projection 27. As the bracket is pushed completely home it clears the free edge 35 of the snap member 32, which has been depressed while the bracket is installed, and the snap member snaps up with the rib 34 against the edge of the bracket, holding it in position. The gong assembly on its bracket can be removed by first depressing the snap member 32 and then swinging out the bracket from engagement with the projection 27.

The new, separate, armature assembly is held in position by engagement under a number of projections 40 to 45, each having a top flange. The metal stamping on which the armature assembly is mounted is shaped so that it has portions which fit under the flange of the projections. Thus one corner fits under projection 40 and another corner fits under 41. A sideways extending tab extends under projection 42 and one side extends under 43. Finally two tabs extend under projections 44 and 45. The stamping is shaped so that it can be dropped onto the position 13 and then slid upwardly in FIG. 1, with the various parts sliding under the flanges of the projections. Slight downward pressure is maintained on the assembly while sliding to depress a snap member 46, similar in form to snap member 32. As the bracket and assembly slides into final position its edge clears the free edge 47 of the snap member 46, rib 48 engaging with the edge of the bracket to retain it in position. Removal is by depressing the snap member to release the bracket.

Thus there is provided an arrangement in which both existing forms of gong and armature assembly and new form of separate gong assembly and armature assembly can be attached to the base plate without alteration or provision of adaptors or the like.

Considering now the network which is positioned at area 11, an older form merely sits in the area 11 which is defined by a series of short, upwardly projecting, ribs 50 and by the step 51 between section 20a and section 20b of the base plate. The network is then attached by rivets through projections on the network base and through holes 52 in the base plate. The new form of network rests on the ribs 50. At two corners of the area 11, on one edge, at 53 and 54 are upward projections with top flanges and small locating ribs are provided at 53. At the opposite edge of the area 11 to the projections 53 and 54, and at approximately the centre, is a snap member 56. This snap member is somewhat similar to snap members 32 and 46 in that it is defined by a U-shaped slot 57, but, as seen in FIG. 4 it has an upstanding flange 58 at the top of which is an inwardly extending rib 59 having an inclined upper surface 60. The new network is slid into position with corners of its base under the projections 53 and 54. Slight downward pressure on the network then depresses the snap member 56, the flange 58 flexing outward under the action of the network base on the inclined surface 60. Once the network is fully down the snap member returns to its original position and the rib 59 extends over the base of the network. To permit removal the flange 58 is recessed and the rib 59 divided at the centre, at the position indicated at 61 in FIGS. 1 and 2, to permit insertion of a tool such as a small spike which can be used to lever the flange 38 outwards and thus release the network.

The line switch, positioned at area 15, has flanges one of which engages at one corner under a projection 65 which extends from projection 54 for the network, and having a top flange. Projection 43 for the armature assembly at area 13 also has a flange 66 extending into the line switch area and a further projection 67 provides a further fastening member. The line switch is slid with its flange under the top flanges of projections 65 and 67, and under flange 66. Pressure on the line switch depresses a snap member 68 similar to snap members 32 and 46, and a rib 69 on the free edge engages with the edge of the line switch base. The line switch can be of existing form and the projections and other features of the base plate positioned to engage with the bottom of the line switch. The line switch can be removed by depressing the snap member 68.

The remaining main feature or item is the dial support bracket, which is positioned at area 14. This bracket extends for a major part of the width of the base plate. The bracket is generally of U-shape having a flat base web and two upstanding legs—the bracket conveniently formed by bending a flat strip of metal. At the upper ends of the legs are provided slots and/or holes for attachment of the dial structure. The bracket is installed, or attached by a slightly rotative sliding movement. Two diagonally opposed projections 75 and 76 extend from the base plate, the projections having top flanges 77 and 78. Opposite each projection is a snap member 79 and 80, snap member 79 opposite projection 75 and snap member 80 opposite projection 76. The bracket is first positioned by resting the base web on the base plate on the section 20c, at an inclination and resting on the snap members 79 and 80. With slight downward pressure and rotation—anticlockwise in FIG. 1, the bracket base engages under the flanges 77 and 78 and eventually moves off of the snap members, which have been slightly depressed. The members then snap up and engage the sides of the bracket base and retain it in position. Removal is by depressing the snap members and rotating the bracket out of engagement with the flanges 77 and 78.

Figure 7:
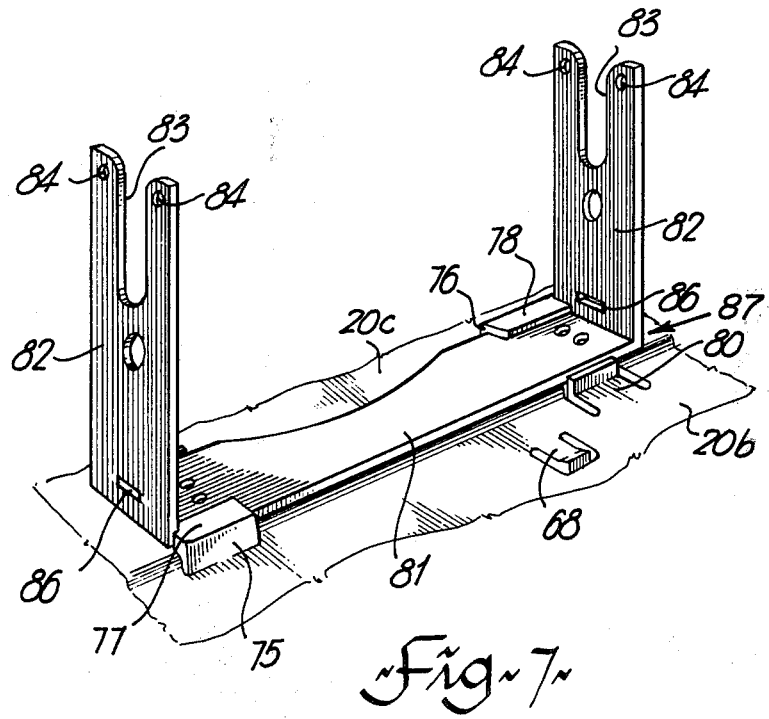
FIG. 7 is a perspective view of a telephone dial mechanism support bracket in position.

FIG. 7 illustrates a dial support bracket 87 in position. The base web 81 rests on the section 20c of the base plate and the legs 82 extend upwards. Slots 83 and holes 84 provide for attachment of the dial mechanism. If desired an additional terminal strip 85 can be provided by being inserted between the legs 82, projections on the ends of the terminal strip fitting in slots 86 in the legs 82.

FIG. 9 illustrates the line switch 90 in position on the base plate. The main frame member 91 has an outwardly extending flange 92 at each side and these flanges extend under the flange 66 and the top flange at projection 67 at one side and under the top flange of projection 65 at the other side. The snap member 68 bears against one edge of a flange 92.

FIG. 10 illustrates the attachment of a present form of gong and armature assembly 95 to the base plate. The metal casting frame is seen at 96, the gongs at 97, the armature assembly at 98 and the striker at 99. A lug or extension 100 at each end of the frame 95 rests over the related boss 26 and screws 101 are screwed into the bosses.

Figure 11:
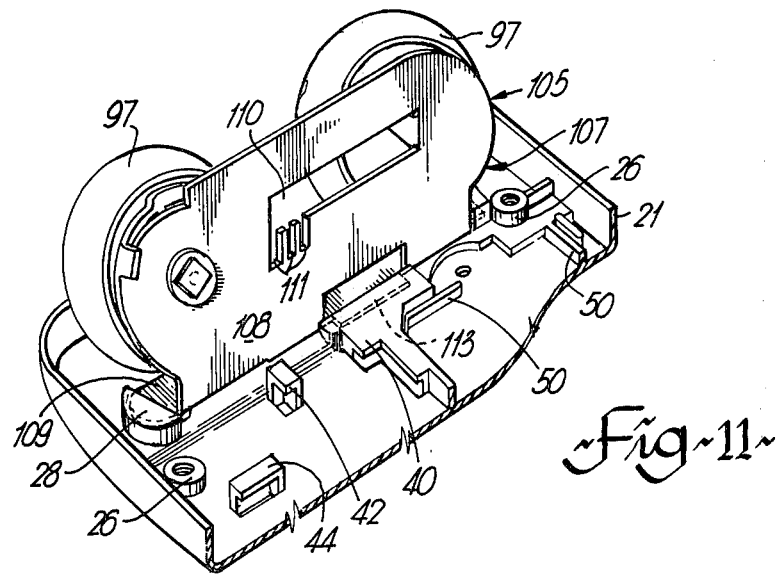
FIG. 11 is a partial perspective view in the direction of arrow A in FIG. 10, of the gong assembly only of FIG. 10.
Figure 12:
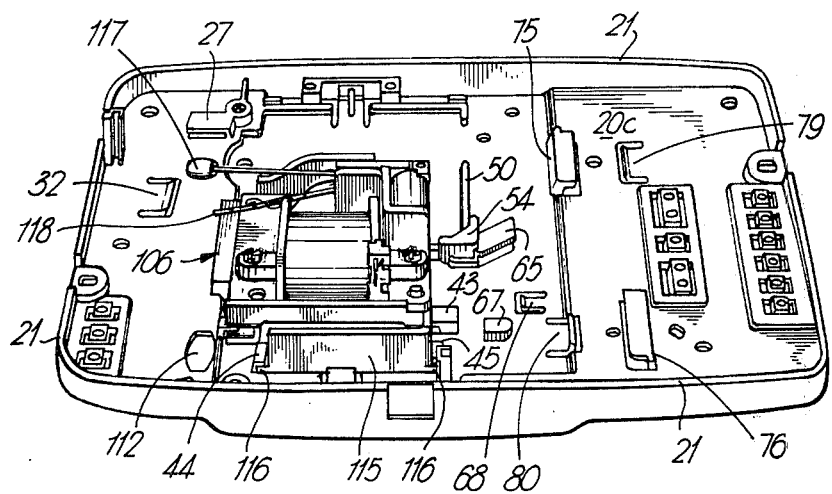
FIG. 12 is a perspective view of the base plate illustrating the armature assembly only of FIG. 10.

FIGS. 11 and 12 illustrate the alternative form of separate gong assembly 105 and armature assembly 106. In FIG. 11, can be seen the metal bracket 107 having a main flat portion 108 and a bottom flange 109. The gongs 97 are mounted on the bracket portion 108 which extends normal to the flange 109. A slot 110 provides access through portion 108 for the striker and small vertical slots 111 provide alternate locating positions for the striker loading spring, the loading spring being positioned in one or other of slots 111 to predetermine the spring load on the striker and thus serve as an initial setting. The normal loudness control is provided being positioned to affect the left gong in FIG. 11. The control knob for the loudness control is accessed through an aperture 112 in the base plate (FIGS. 1 and 2). The ends of the flange 109 extend under the top flanges of the projections 27 and 28 and is held in position by the snap member 32. Also, as illustrated in FIG. 11 a small tongue 113 is cut and bent out of the main portion 108 at its junction with the flange 109 the tongue extending in a recess formed by extension of the projections 40 and 53. This assists in stabilizing the bracket 107.

FIG. 12 illustrates the armature assembly 106. The assembly includes a bent framework member 115 having small webs 116 positioned to engage under the top flanges of the projections 44 and 45. Another small web engages under the top flange of projection 43. Also small flanges on the side of the assembly not seen in FIG. 12 engage under the top flanges of projections 40 and 41. Snap member 46 bears against the frame member 115. The striker is seen at 117 and striker loading spring at 118.

Figure 13:
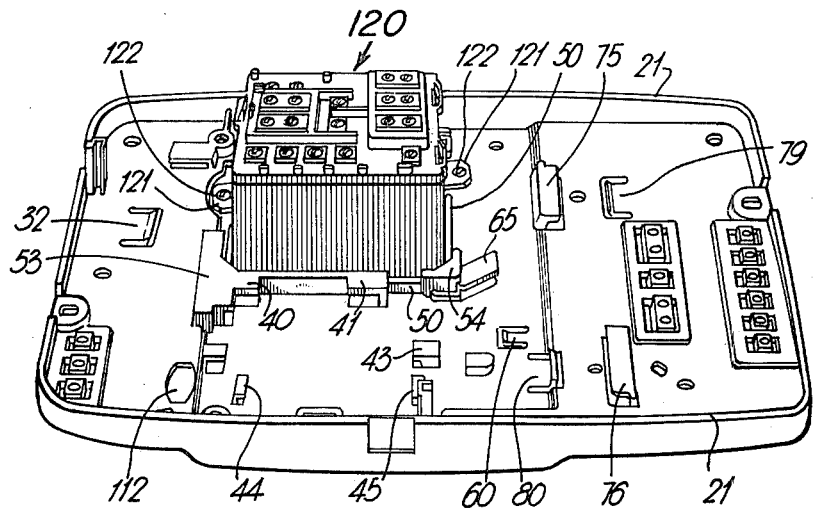
FIG. 13 is a perspective view of the base plate with one form of network unit attached to the base plate.
Figure 14:
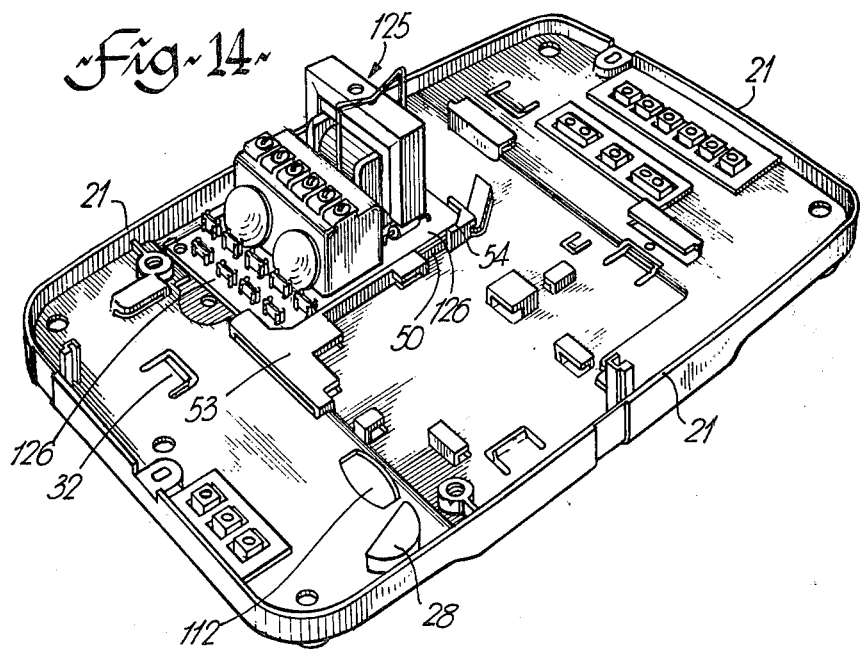
FIG. 14 is a perspective view of the base plate with an alternative form of network unit attached to the base plate.

FIGS. 13 and 14 illustrate the attachment of two alternate forms of network, FIG. 13 being for the previous and older form and FIG. 14 for the newer form. In FIG. 13 the network 120 is of general box-like form which rests on the surface of the base plate in the section 20b, located by the ribs 50. Two small lugs or projections 121 extend from the base member of the network and these align with holes 52 with rivets 122 attaching the network to the base plate.

In FIG. 14 the newer type of network 125 is shown. This is built up on a printed circuit board 126. Two corners of the board 126 fit under the top flanges of projections 53 and 54. The board resting on the ribs 50. As the network 125 is pressed down it deflects the snap member 56 (FIGS. 1 and 2) with the printed circuit board eventually engaged under the rib 59 (FIG. 4).

The line and handset cord restraint pillars 17 and 18 are molded adjacent thinned pushout portions 127 and 128 in the peripheral rim 21. When modular plugs and sockets are used, that is when the handset cord, and also the line cord, is plugged into the telephone set, the plugs can be attached by sliding onto the peripheral rim 21 before assembly of the top housing to the base plate, at positions adjacent to the pillars 17 and 18.

Provision for attachment of other items can be made. Thus a line switch, and indicator, can be mounted on section 20c by means of screws passing through holes 130 (FIG. 1). The base plate is attached to the telephone top housing by screws passing through the holes 131.

Additional holes 132 are provided for the attachment of rubber feet. Depending upon needs, or requirements three or four feet can be provided. Thus, considering FIG. 2, two feet can be attached at the holes 132 at the right hand end, while a single foot can be provided at the central hole 132 at the left hand end, or two feet can be provided at the top and bottom holes 132 at the left hand end. The holes 132 have bosses 133 surrounding them on the undersurface of the base plate for reception of the rubber feet. The rubber feet normally extend only a very short distance below the bosses and if a single foot is provided at the left hand end in FIG. 2, the other two bosses limit any tilting. It can be more useful to be able to provide three feet, for a three point support, as some distortion of the base plate can occur during and after molding, creating problems in obtaining a non-rocking support if four feet are used.

What is claimed is:

1. A base plate for a telephone set, comprising:
   a molded plastic member having a base web and an upwardly extending rim around the periphery of the base web;
   a plurality of integrally molded projections extending upwardly from said base web each projection including a top portion spaced from and extending parallel to a surface of said base web to form an undercut;
   a plurality of integrally molded cantilevered deflectable members in said base web, each member including a rib at a free end thereof, said rib extending above said surface of said base web;
   said projections and said deflectable members defining a plurality of mounting positions for mounting telephone set items, each position including at least two of said projections and at least one of said deflectable members;
   the arrangement such that a telephone set item can be mounted at each said position by a sequential sliding and downward movement to engage a part of said item under said undercuts and to initially deflect said deflectable member by pressing down on said rib whereby said item slides over the rib, said deflectable member returning to an initial undeflected position with said rib engaging with said item when said item is in a final position to maintain said item in said final position; and
   alternative locating and mounting means at at least one of said positions for mounting an alternate form of item at said position by separate attachment members.

2. A base plate as claimed in claim 1, at least one of said positions including two of said projections and two of said deflectable members.

3. A base plate as claimed in claim 2, said position adapted for mounting an elongate item having a flat base member and including a projection and a deflectable member at each end of said position, the projection at one end on an opposite side of said position to the projection at the other end, said top portion of said projection extending towards the related deflectable member, the free end of each deflectable member extending towards the related projection, whereby the elongate item is mounted by rotational movement of said flat base member to insert the ends of the base member under the top member of each projection and said ribs on said deflectable members engaging with the flat base member to retain the elongate item in position.

4. A base plate as claimed in claim 1, said base web comprised of three sections, a central section and an end section on either side of said central section, said end sections raised relative to said centre section.

5. A base plate as claimed in claim 1, including line cord and handset cord restraint members on said rim, said restraint members molded integrally with said rim.

6. A base plate as claimed in claim 5, including portions of reduced thickness in said rim adjacent to said restraint members.

7. A base plate as claimed in claim 1, including at least one further mounting position, said further position including at least one of said integrally molded projections extending upwardly from said base web, and at least one integrally molded cantilevered deflectable member having an upwardly extending flange at its free end and an inwardly extending rib at the upper end of said flange, said rib extending in a direction away from said free end, a telephone set item being mounted at said further position by a sequential sliding and downward movement to engage a part of said item under the undercuts formed by said projections and to initially outwardly deflect said flange of said deflectable member, said item moving down past said inwardly extending rib, said flange returning to an initial undeflected position with said rib engaging over a part of said item with said item in its final position.

8. A base plate as claimed in claim 7, said inwardly extending rib having an inclined front surface, said inclined front surface forming a ramp to assist in deflection of said flange of said deflectable member on positioning of said item.

9. A base plate as claimed in claim 1, at least some of said ribs including a downwardly and rearwardly inclined rear surface, said inclined surface forming a ramp extending downwardly in the direction of said sliding movement.

* * * * *